Oct. 3, 1944.　　　D. R. LIGH　　　2,359,654
LUBRICATING ARRANGEMENT
Filed Nov. 3, 1943
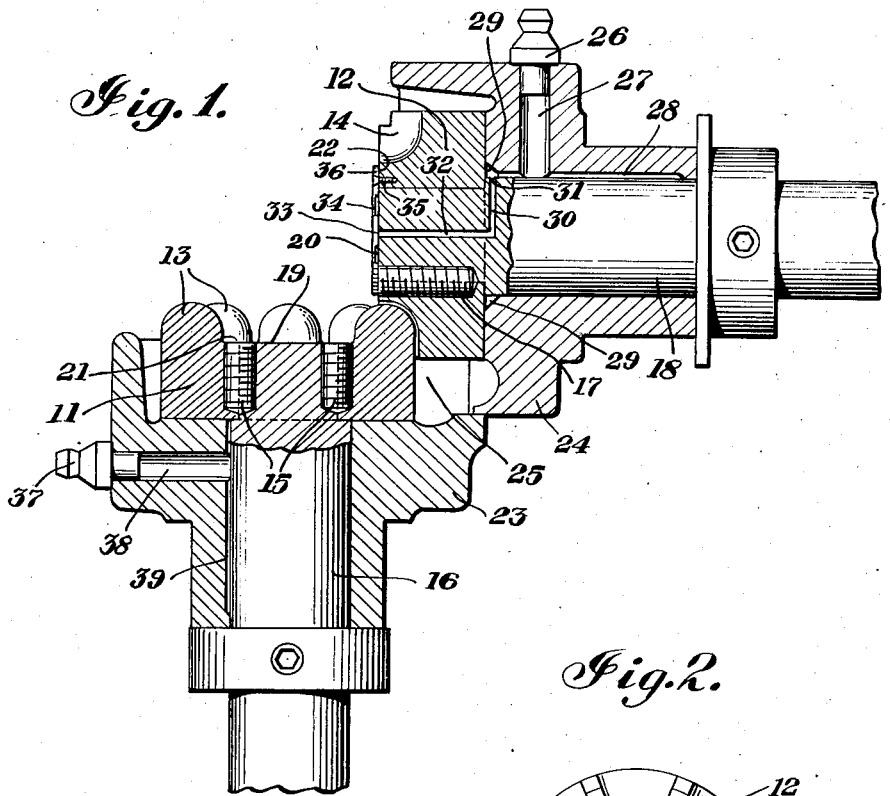
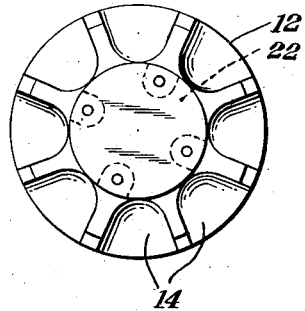
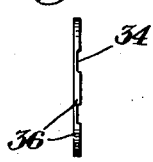
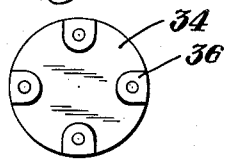
INVENTOR:
David R. Ligh
BY Patented Oct. 3, 1944

2,359,654

UNITED STATES PATENT OFFICE 2,359,654

LUBRICATING ARRANGEMENT

David R. Ligh, Stamford, Conn., assignor to Darli Industrial Management, Incorporated, Hartford, Conn.

Application November 3, 1943, Serial No. 508,832

7 Claims. (Cl. 74—467)

My present invention relates to power transmitting gears and more particularly to lubricating arrangements for such gears.

An object of my invention consists in the production of a device of the type specified which is constructed in such a manner that all parts, particularly the power transmitting elements, e. g., teeth of the gears may be easily, sufficiently and properly lubricated.

Another object of my invention is a lubricating device for gears which is particularly simple in construction and easy to install and remove whenever desired.

Still another object of my invention is provision of a lubricating device of the type specified which will be simple in construction, readily built, easily maintained in operation and durable and efficient in use.

A further object of my invention consists in a lubricating device which is adapted to lubricate each of the teeth or other power transmitting elements of the gear in such a manner that the lubricant is equally divided among these teeth.

Still a further object of my present invention consists in lubricating means which are arranged in such a manner as to conduct lubricant not only to the power transmitting elements of that gear of which it forms a part but also to the power transmitting elements, e. g., teeth of the meshing gear.

Still a further object of my invention consists in a lubricating arrangement for gears which consists mainly of separate parts which are mounted on an outer face of the gear so that they are easily accessible and thus do not necessitate substantial changes in the gear construction itself.

With the above objects in view, my present invention mainly consists of the combination of a shaft having an end face, a duct in this shaft extending in longitudinal direction of the same and reaching to the end face of this shaft, thus forming a duct opening in this end face, and being adapted to conduct lubricant to this end face through the duct opening in the same, a gear secured to this shaft near this end face co-axially with the same, and distributing means co-operating with the above mentioned duct opening in the shaft end face; according to my invention these distributing means are constructed and built in such a manner as to be adapted to conduct the lubricant supplied through the above mentioned duct and the duct opening in the end face of the shaft to the gear which, as stated above, is secured to the shaft near its end face coaxially with the same.

These distributing means are secured preferably to the shaft and/or the gear rotating together with the same during operation of the gear. These means operate preferably in such a manner as to conduct the lubricant along the end face of the shaft to the circumference of this face so that the lubricant reaches the gear secured to the shaft. Of course, the gear is provided with power transmitting elements, e. g., teeth, and the distributing means have to be arranged in such a manner as to conduct the lubricant to these power transmitting elements of the gear.

I prefer to use as distributing means a flat distributing member arranged parallel to the end face of the shaft at a slight distance therefrom adapted to conduct the lubricant between the shaft end face and the inner face of this flat member to the circumference of the shaft end face so that the lubricant is equally distributed along this circumference and reaches the gear and the power transmitting elements of the same.

I prefer to use as distributing member an at least substantially circular flat distributing disk arranged co-axially with the shaft at a slight distance from the end face of the shaft in the way described above. This distributing disk is preferably slightly larger than the end face of the shaft; in accordance with a preferred embodiment of my present invention, this disk has a diameter which is slightly smaller than the distance between two opposite power transmitting elements of the gear; this ensures proper supply of lubricant to these power transmitting elements.

I have found it advantageous to arrange the gear on the shaft in such a manner that the outer circular flat face of the gear is arranged at least substantially flush with the end face of the shaft, thereby facilitating supply of lubricant along this end face and the face of the gear to the power transmitting elements of the latter.

I have found that my present invention presents particular advantages for lubricating of gears provided with power transmitting elements arranged on the flat face of the gear near the circumference of the same. It is evident that the lubricating means, i. e., the flat lubricating member or plate arranged parallel to the end face of the shaft, will be particularly well adapted to guide lubricant to power transmitting elements arranged in this way, i. e., provided on the flat face of the gear.

Of course, it should be mentioned that the power transmitting elements of the gear for which my lubricating means may be used may be of the most different types. Thus, I may use my lubricating arrangement for spur gears as well as for bevel gears, pinions, helical or worm gears; however, I have found that my new lubricating device is particularly adapted for joints comprising two meshing gears, one of which is provided with socket-like depressions on one flat end face and the other with hemispherical teeth-like projections. In this case, it is preferable to combine the lubricating arrangement with the gear provided with the socket-like depressions and to arrange the distributing plate in such a way that it reaches almost to these depressions. For this purpose, the diameter of the distributing plate has to be slightly smaller than the distance between two opposite sockets of the gear.

The novel features which I consider as characteristic for my invention are set forth in particular in the appended claims. The invention itself, however, both as to its construction and its method of operation, together with additional objects and advantages thereof, will be best understood from the following description of specific embodiments when read in connection with the accompanying drawing, in which:

Figure 1 is a cross section of a joint comprising gears equipped with lubricating means of the type claimed by me;

Figure 2 is an end view of the gear having sockets seen in direction or arrow 2 in Figure 1;

Figure 3 is a top view of the distributing disk used for my new lubricating device; and Figure 4 is a side view of the distributing disk shown in Figure 3.

The joint shown in Figures 1 and 2 consists of two gear members 11 and 12. As shown in the drawing gear member 11 is provided with hemispherical projections 13 adapted to mesh with corresponding sockets 14 in gear member 12. As shown in Figure 1, gear member 11 is attached to shaft 16 by means of screws 15, while gear member 12 is attached to shaft 18 by means of screws 17. Both gears 11 and 12 are attached to the corresponding shafts 16 and 18 in such a manner that the end faces 19 and 20 of shafts 16 and 18 respectively are flush with the faces 21 and 22 of the gears 11 and 12 respectively.

The housing members 23 and 24 supporting shafts 16 and 18 as shown in Figure 1 are connected with each other by pivoting member 25, shown only partly in the drawing and forming no part of the present invention.

As explained above, lubrication of sockets 14 and the co-operating hemispherical projections 13 is obtained by a lubricating arrangement. This arrangement comprises a lubricating fitting 26, such as an Alemite fitting, reaching into duct 27 serving as grease reservoir. This duct 27 is connected with duct 28 formed by a groove in the inner cylindrical surface of housing 24. This duct 28 distributes the lubricant along that part of shaft 18 which serves as bearing, thereby avoiding friction between housing 24 and shaft 18.

Furthermore, this duct 28 conducts the lubricant to an annular duct 29 formed in housing 24 as shown in Figure 1. The radial bore 30 in shaft 18 is arranged in such a manner that during rotation of shaft 18 the open end 31 of this bore reaches permanently into duct 29, thereby establishing permanent connection between bore 30 and duct 27 serving, as explained above, as grease reservoir.

As shown in the drawing, this radial bore 30 is connected with the axial bore 32 in shaft 18 which latter ends in a duct opening 33 in the end face 20 of shaft 18. In this way, grease or other lubricant might be supplied from the lubrication fitting 28 to the end face 20 of duct 18.

In order to direct the lubricant supplied through duct opening 33 toward the sockets 14 and the hemispherical projections 13 meshing with the same, I provide in accordance with my present invention in combination with gear 22 and shaft 18 a distributing disk 34 secured to gear 22 by means of screws 35 at a slight distance from the end face 20 of shaft 18. As shown in the drawing, particularly in Figure 2, the diameter of this distributing disk 34 is slightly smaller than the distance of two opposite sockets 14; thus, this disk 34 reaches nearly to the sockets 14 ensuring that substantially all lubricant supplied through duct 32 reaches the sockets 14.

As shown in Figures 3 and 4, I may obtain proper spacing between the distributing disk 34 and end face 20 of shaft 18 by small, preferably stamped projections 36 on disk 34 holding this disk at the necessary distance from end face 20 of shaft 18. I wish, however, to emphasize that this spacing may also be obtained by other means as for instance small washers or the like. In this latter case, however, the disk is preferably entirely flat and the required distance is obtained by properly choosing the thickness of the washers used.

It is evident from above description that lubricant will reach not only the sockets 14 in gear 20 but that during operation of the joint the hemispherical projections 13 of gear 11 will also be duly lubricated; this result is obtained on the one hand by the lubricant accumulating in sockets 14 and on the other hand by lubricant supplied to the uppermost portions of the hemispherical projections 13 directly from disk 34 while these projections mesh with the sockets 14.

Of course, it is possible to provide lubricating means of the type described also in combination with the gear 11 equipped with hemispherical projections 13, should this be desired. In the embodiment shown in the drawing, however, gear 11 is not provided with any lubricating means for projections 13 but it is assumed that the same will be duly lubricated by their mesh with sockets 14 as explained above. Provision is made only for lubricating shaft 16 by means of the Alemite fitting 37, duct 38 serving as grease reservoir, and groove 39 distributing the grease along shaft 16.

I wish to stress expressly that although I have shown only meshing gears of a specific type, my new lubricating device may be used for gears of whatever type if the same are arranged at the end of a shaft. In all such cases, my new lubricating arrangement provides an extremely simple, efficient and inexpensive way of lubricating the meshing gear teeth.

I also wish to stress that the term "in longitudinal direction of the shaft" as used in the preceding description and the following claims, is intended to be understood as "extending between two points of the shaft which are spaced apart from each other in longitudinal direction of the shaft." This means that this term is not intended to limit the claims to constructions provided with a duct arranged within the shaft in parallel direction to the longitudinal axis of the same but that all constructions provided with one or more ducts connecting points of the shaft which are spaced from each other in longitudinal direction of the shaft are intended to be comprehended within the meaning of this term.

It will be understood that each of the elements described above, or two or more together, may also find a useful application in other types of gears and joints differing from the types described above.

While I have illustrated and described the invention as embodied in joints comprising gears provided with sockets and hemispherical meshing projections, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What I claim as new and desire to secure by Letters Patent is:

1. In combination, a shaft having an end face, a duct in said shaft extending in longitudinal direction of the same and reaching to said end face of said shaft, forming a duct opening in the same and being thus adapted to conduct lubricant to said end face of said shaft through said duct opening in said end face, a gear secured to said shaft near said end face of said shaft co-axially with the same, and distributing means co-operating with said duct opening in said end face of said shaft adapted to conduct said lubricant supplied through said duct and said duct opening in said end face of said shaft to said gear.

2. In combination, a shaft having an end face, a duct in said shaft extending in longitudinal direction of the same and reaching to said end face of said shaft, forming a duct opening in the same and being thus adapted to conduct lubricant to said end face of said shaft through said duct opening in said end face, a gear secured to said shaft near said end face of said shaft co-axially with the same, and distributing means secured to said shaft and said gear and being adapted to conduct lubricant along said end face to the circumference of said face so that said lubricant reaches the gear secured to said shaft near said end face.

3. In combination, a shaft having an end face, a duct in said shaft extending in longitudinal direction of the same and reaching to said end face of said shaft, forming a duct opening in the same and being thus adapted to conduct lubricant to said end face of said shaft through said duct opening in said end face, a gear secured to said shaft near said end face of said shaft co-axially with the same, and a flat distributing member arranged parallel to said end face of said shaft at a slight distance therefrom adapted to conduct said lubricant supplied through said duct and said duct opening in said end face of said shaft to said gear.

4. In combination, a shaft having an end face, a duct in said shaft extending in longitudinal direction of the same and reaching to said end face of said shaft, forming a duct opening in the same and being thus adapted to conduct lubricant to said end face of said shaft through said duct opening in said end face, a gear secured to said shaft near said end face of said shaft co-axially with the same, and an at least substantially circular flat distributing plate being slightly larger than said end face of said shaft and being secured co-axially to said shaft parallel to said end face of said shaft at a slight distance therefrom adapted to conduct said lubricant supplied through said duct and said duct opening in said end face of said shaft to said gear.

5. In combination, a shaft having an end face, a duct in said shaft extending in longitudinal direction of the same and reaching to said end face of said shaft, forming a duct opening in the same and being thus adapted to conduct lubricant to said end face of said shaft through said duct opening in said end face, a gear provided with an at least substantially circular flat face arranged at least substantially flush with said end face of said shaft, a series of power transmitting elements on said circular flat face of said gear arranged near the circumference of the same, said gear being secured to said shaft near said end face of said shaft co-axially with the same, and an at least substantially circular flat distributing member being slightly larger than said end face of said shaft and being secured co-axially to said shaft parallel to said end face of said shaft at a slight distance therefrom adapted to conduct said lubricant supplied through said duct and said duct opening in said end face of said shaft to said power transmitting elements of said gear secured to said shaft.

6. In combination, a shaft having an end face, a duct in said shaft extending in longitudinal direction of the same and reaching to said end face of said shaft, forming a duct opening in the same and being thus adapted to conduct lubricant to said end face of said shaft through said duct opening in said end face, a gear provided with an at least substantially circular flat face arranged at least substantially flush with said end face of said shaft, a series of depressions in said circular flat face of said gear near the circumference of the same, said gear being secured to said shaft near said end face of said shaft co-axially with the same, and distributing means cooperating with said duct opening in said end face of said shaft adapted to conduct said lubricant supplied through said duct and said duct opening in said end face of said shaft to said depressions in said circular flat face of said gear secured to said shaft.

7. In combination, a shaft having an end face, a duct in said shaft extending in longitudinal direction of the same and reaching to said end face of said shaft, forming a duct opening in the same and being thus adapted to conduct lubricant to said end face of said shaft through said duct opening in said end face, a gear provided with an at least substantially circular flat face, said gear being secured to said shaft with said circular flat face at least substantially flush with said end face of said shaft, a series of depressions in said circular flat face of said gear near the circumference of the same, and an at least substantially circular flat distributing disk having a diameter being slightly smaller than the distance between two opposite depressions in said circular flat face of said gear, said disk being secured to said gear co-axially with the same and said shaft parallel to said face of said gear and said end face of said shaft at a slight distance therefrom adapted to conduct said lubricant supplied through said duct and said duct opening in said end face of said shaft to said depressions in said circular flat face of said gear secured to said shaft.

DAVID R. LIGH.